US008873506B2

(12) United States Patent
Lerzer et al.

(10) Patent No.: US 8,873,506 B2
(45) Date of Patent: Oct. 28, 2014

(54) TECHNIQUE FOR TRANSFERRING DATA BETWEEN AN APPLICATION AND A NETWORK

(75) Inventors: Jürgen Lerzer, Neumarkt/OPf (DE); Hubert Schorr, Zeil (DE); Reinhold Schneider, Veitsbronn (DE); Thorsten Birk, Nuremberg (DE); Matthias Grimm, Stein (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1095 days.

(21) Appl. No.: 12/809,479

(22) PCT Filed: Dec. 18, 2008

(86) PCT No.: PCT/EP2008/010797
§ 371 (c)(1),
(2), (4) Date: Jun. 18, 2010

(87) PCT Pub. No.: WO2009/080276
PCT Pub. Date: Jul. 2, 2009

(65) Prior Publication Data
US 2010/0316021 A1    Dec. 16, 2010

Related U.S. Application Data

(60) Provisional application No. 61/053,765, filed on May 16, 2008, provisional application No. 61/053,776, filed on May 16, 2008.

(30) Foreign Application Priority Data

Dec. 21, 2007  (EP) .................................. 07025054

(51) Int. Cl.
*H04W 4/00*     (2009.01)
*H04W 36/00*    (2009.01)
*H04W 28/08*    (2009.01)
*H04W 36/02*    (2009.01)
*H04W 88/06*    (2009.01)
*H04W 36/14*    (2009.01)

(52) U.S. Cl.
CPC ............ *H04W 88/06* (2013.01); *H04W 36/005* (2013.01); *H04W 28/08* (2013.01); *H04W 36/023* (2013.01); *H04W 36/02* (2013.01); *H04W 36/14* (2013.01)
USPC ........................................................ 370/331

(58) Field of Classification Search
None
See application file for complete search history.

(56) References Cited

U.S. PATENT DOCUMENTS

| 2003/0139184 A1* | 7/2003 | Singh et al. .................. 455/436 |
| 2007/0173283 A1 | 7/2007 | Livet |
| 2008/0188223 A1 | 8/2008 | Vesterinen |
| 2008/0244095 A1* | 10/2008 | Vos et al. ....................... 709/250 |
| 2008/0304454 A1* | 12/2008 | Zhong et al. .................. 370/331 |

FOREIGN PATENT DOCUMENTS

| AU | 200135071 A * | 9/2001 | ............. H04L 29/08 |
| WO | WO 2007/007913 A | 1/2007 | |
| WO | WO2007/093110 * | 8/2007 | |
| WO | WO 2008023814 A2 * | 2/2008 | ............... H04Q 7/38 |

OTHER PUBLICATIONS

Takeshi Takahashi, Jarmo Harju, Koichi Asatani, Hideyoshi Tominaga, Inter-domain Handover Scheme based on Forwarding Router Discovery for Mobile IP Networks, Proceedings of the IEEE 2005 Conference on Wireless Communications and Networking, Mar. 17, 2005, vol. 3, pp. 1409-1414.*
Device Drivers (Author Unknown, Wikipedia Entry on Device Drivers, http://en.wikipedia.org/wiki/Device_driver, as archived by the internet archive, www.archive.org, on Jan. 2006, pp. 1-4).*
Author Unknown, MIH Support, Document No. IEEE 802.11/1016r1 TGu, Sep. 17, 2006, pp. 1-17.*

* cited by examiner

Primary Examiner — John Blanton
Assistant Examiner — Christopher Crutchfield

(57) ABSTRACT

A technique for transferring data between an application and at least two Radio Access Technology (RAT) modules selectively connectable to a network is described. A device embodiment of this technique comprises a storage adapted to hold data from the application, the data being intended to be transmitted via at least one of the RAT modules. Furthermore, the device comprises a first control mechanism adapted to initiate holding of the data in the storage when the RAT modules assume the same connection state. The connection state is selected from a connected state in which data transmission via the respective RAT is enabled and a disconnected state in which data transmission via the respective RAT is disabled. The device also comprises a second control mechanism adapted to initiate sending of the data held in the storage to the RAT module assuming the connected state when the RAT modules assumed different connection states again.

22 Claims, 12 Drawing Sheets

| LTE NETWORK STATE | UMTS NETWORK STATE | LTE DL ENABLED | LTE UL ENABLED | UMTS DL ENABLED | UMTS UL ENABLED |
|---|---|---|---|---|---|
| Disconnected | Disconnected | NO | NO | NO | NO |
| Connected | Disconnected | YES | YES | NO | NO |
| Disconnected | Connected | NO | NO | YES | YES |
| Connected | Connected | YES | NO | YES | NO |

| Command | Data Bit 0 | Data Bit 1 | Data Bit 2 | Data Bit 3 |
|---|---|---|---|---|
| Connect to PC | 1 | 1 | 1 | 1 |
| Disconnect from PC | 0 | 0 | 0 | 0 |
| Ignore UMTS commands | 1 | 0 | 1 | 0 |
| Switch from LTE to UMTS | 1 | 1 | 0 | 0 |
| Switch from UMTS to LTE | 0 | 0 | 1 | 1 |
| Disconnect uplink(both) | 1 | 0 | 1 | 0 |

1300

TECHNIQUE FOR TRANSFERRING DATA BETWEEN AN APPLICATION AND A NETWORK

This application claims the benefit of U.S. Provisional Application No. 61/053,765, filed May 16, 2008, and U.S. Provisional Application No. 61/053,776, filed May 16, 2008, the disclosures of which are fully incorporated herein by reference.

TECHNICAL FIELD

The present disclosure generally relates to the provision of network access via a Radio Access Technology (RAT). In particular, the disclosure is directed to a technique for transferring data between an application and two or more RAT modules that are selectively connectable to a network.

BACKGROUND

As wireless Network Access Points (NAPs) are becoming ubiquitous, it is only a logical consequence that many mobile devices support more than one RAT to offer an increased connectivity. In this regard, US 2007/0173283 A1 describes an exemplary mobile device supporting two different RATs. Specifically, the mobile device comprises a first module providing network access according to the Universal Mobile Telecommunications System (UMTS) specifications and a second module network providing access to a Wireless Local Area Network (WLAN).

Such multi-RAT devices are typically designed to permit a handover between the internal RATs (IRAT handover). IRAT handovers may, for example, be performed in case coverage of one RAT is fading or another RAT with better Quality of Service (QoS) parameters becomes locally available. For the coordination of IRAT handovers, in US 2007/0173283 A1 a mobility middleware function is proposed. The mobility middleware function comprises an IRAT handover functionality that performs seamless handover between the UMTS network and the WLAN with the purpose of providing service continuity to a user.

Multi-RAT devices as those discussed in US 2007/0173283 A1 suffer from the drawbacks that a seamless handover typically requires a data connection between the RAT modules and an associated control mechanism for inter-module data transfer. Such an inter-module data connection is required for the following reason. When a handover from a first RAT supported by a first RAT module to a second RAT supported by a second RAT module is in progress, the uplink data from a user application are during the handover phase still sent to the first RAT module. Has the handover to the second RAT been successful, the first RAT module will thus typically still have user data in its local buffers that has not been transmitted. This user data will have to be transferred via the data connection to the second RAT module for transmission. Otherwise, i.e., if the user data buffered by the first RAT module is simply discarded, problems on the network side (which may still be expecting the buffered user data) and on the side of the mobile device (e.g., an instability of the user application that is expecting response data from the network) may occur.

Obviously, the data transfer between the RAT modules in connection with a seamless handover requires additional data interfaces and additional control mechanisms to align the data stream towards the network. Such interfaces and control mechanisms lead to additional costs. Moreover, it might be difficult to harmonize the inter-module data transfer in case the involved RAT modules come from different manufactures with proprietary interfaces and proprietary control mechanisms.

Similar problems arise in case the first RAT module becomes temporarily disconnected from the network while the second RAT module is not (or not yet) connected. In such a case the user application may continue sending user data towards the buffers of the first RAT module, while it is uncertain whether the first RAT module will become connected again or whether the second RAT module will become connected instead (e.g., because first RAT coverage got lost).

SUMMARY

There is a need for a technique for transferring data between an application and two or more RAT modules that avoids at least some of the drawbacks discussed in the foregoing.

According to a first aspect, a device for transferring data between an application and at least two RAT modules selectively connectable to a network is provided. The device comprises a storage adapted to hold (e.g., to buffer) data from the application, the data being intended to be transmitted via at least one of the RAT modules; a first control mechanism adapted to initiate holding of the data in the storage when the RAT modules assume the same connection state, wherein the connection state is a connected state in which data transmission via the respective RAT is enabled or a disconnected state in which data transmission via the respective RAT is disabled; and a second control mechanism adapted to initiate sending of the data held in the storage to the RAT module assuming the connected state when the RAT modules assume different connection states again.

The holding of the data may comprise queuing the data in the storage (e.g., in the order received from the application). Of course, the data may be held in the storage also in a non-queued manner. The storage may be configured as a buffer allowing a temporal data buffering.

The individual RAT modules (also called mobile platform modules herein) may be realized in various ways. In one implementation, at least one of the RAT modules is realized in the form of a delimitated chip or chip set. The delimitated chip or chip set may comprise Radio Frequency (RF) components tailored to support the respective RAT and, additionally or alternatively, a digital baseband processor adapted to perform baseband processing operations for the respective RAT. In one variation, at least one of the RAT modules may comprise or may be constituted by an Application Specific Integrated Circuit (ASIC), a Digital Signal Processor (DSP) or a Field Programmable Gate Array (FPGA).

In accordance with the paradigm of modularity, at least one of the RAT modules may be configured to be re-useable either in a stand-alone configuration or in a dual (or triple, etc.) mode configuration. In a multi-mode configuration, two or more RAT modules may be co-located within one and the same hardware device and may be provided with optional inter-module data and/or inter-module control interfaces. It should be noted that the term RAT module as used herein also encompasses RAT modules (e.g., chips or chip sets) that are only intended for use in a non-modular stand-alone configuration.

In one implementation, the device further comprises a timer configured to be started upon initiating the holding of the data. Various measures can be triggered by expiry of the timer. For example, the data in the storage may be discarded in case the RAT modules have not assumed different connection states upon expiry of the timer. Additionally, or in the alternative, a notification may be sent to at least one of the RAT modules and the application upon expiry of the timer. The one or more RAT modules may forward the notification to the network. The notification may notify the receiving entity that the data held in the storage has been discarded. In one scenario, the timing and (optional) discarding operations are only performed in context with the RAT modules all assuming the disconnected state.

The device may further comprise a data route bypassing the storage. The data route may be adapted to forward data coming from at least one of the RAT modules directly to the application. The forwarding of the data to the application may be performed as long as at least one of the RAT modules assumes the connected state and in particular during an IRAT handover phase (in which two or more of the RAT modules assume the connected state). In one possible IRAT handover scenario with two or more connected RAT modules, the uplink data from the application may be fed to the storage while at the same time the downlink data from one or more RAT modules may be directly forwarded to the application without any holding latency.

The device may comprise one, more or all of the RAT modules itself. Additionally, or as an alternative, the device may have access to one, more or all RAT modules via an external interface. In such a case, at least one of the RAT modules may be installed on an external apparatus and can be coupled to the device via its external interface.

The device may be configured as a PC, as a laptop, as a mobile telephone, as a network card, as a chip or chip set or as a similar stationary or mobile device. The device may be configured to be removably connected to the external apparatus via a cable (e.g. via a USB cable) or directly via suitable connectors. The external apparatus hosting one or more of the RAT modules may have a similar or different configuration than the device. In one variant, the external apparatus is configured as a mobile telephone or as a network card.

In one implementation, the device is coupled via the external interface to at least two RAT modules installed on the external apparatus. In such a scenario, the device may further comprise a logical interface for each RAT module of the external apparatus as well as an interface driver for presenting the two logical interfaces as a single network interface to the application.

According to a further aspect, a method of transferring data between an application and at least two RAT modules selectively connectable to a network is provided. The method comprises receiving data from the application, the data being intended to be transmitted via at least one of the RAT modules; holding the data in a storage when the RAT modules assume the same connection state, wherein the connection state is a connected state in which data transmission via the respective RAT module is enabled or a disconnected state in which data transmission via the respective RAT module is disabled; and sending the data held in the storage to the RAT module assuming the connected state when the RAT modules assume different connection states again.

The method may further comprise starting a timer upon initiating the holding of the data in the storage. The data held in the storage may be discarded if the RAT modules have not assumed different connection states (e.g., remain in the disconnected state) upon expiry of the timer.

Holding of the data in the storage may be initiated during a disconnecting phase in which at least one connected first RAT module enters the disconnected state and at least one disconnected second RAT module remains in the disconnected state. Additionally, or in the alternative, holding of the data in the storage may be initiated during an IRAT handover phase in which at least one disconnected first RAT module enters the connected state and at least one connected second RAT module remains in the connected state.

In one implementation, the method further comprises forwarding data coming from at least one of the RAT modules directly to the application. This forwarding of the data to the application may be performed concurrently with holding the data coming from the application in the storage. Especially during an IRAT handover phase in which at least two of the RAT modules are connected, the downlink data from one or more of the connected RAT modules may thus be transferred to the application without any holding latency, while the uplink data from the application may be held in the storage until the IRAT handover phase has been (successfully or unsuccessfully) concluded.

The method may further comprise receiving connection information from at least one of the RAT modules. The connection information for a specific RAT module may be indicative of whether the RAT module is connected to or disconnected from the network. The connection information may thus have (at least) a binary information content. In the case connection information is received, the method may further comprise controlling at least one of the holding of the data in the storage and the sending of the held data from the storage based on the connection information.

The connection information received from one of the RAT modules may be indicative of the connected state if the respective RAT module gets connected to its access network or establishes a first packet domain connection to its access network. On the other hand, the connection information may indicate the disconnected state if the respective RAT module gets disconnected from its access network or upon release of the last packet domain connection to its access network.

The connection information may also be used to signal a handover state by the RAT modules. For example, the connection information received from one of the RAT modules may indicate the connected state if the respective RAT module receives (e.g., from the network, an external terminal device or another RAT module) a handover command to take over. On the other hand, the connection information may indicate the disconnected state if the respective RAT module receives a handover complete message regarding the take over by another RAT module. While the signalling of handover messages using connection information is advantageous from certain points of view, the handover signalling could also be performed using dedicated messages containing this handover information.

The method may further comprise receiving one or more control commands. The control commands may be directed to various control tasks. For example, the control commands may be directed to at least one of an IRAT handover control, a validity of control commands received from at least one other of the RAT modules, a connection control towards the application, and a connection control towards one or more of the RAT modules. The control commands may be received from at least one of the RAT modules (e.g., from each RAT module). The control commands received from the one or more RAT modules may have been generated by the RAT modules themselves or by a remote network component attached via the RAT to the respective RAT module. The control commands may also be received from the application.

The control commands may be encoded in the connection information. For example, a particular sequence of (e.g., binary) connection information may represent or be indicative of a specific control command.

In a further implementation, the method may comprise establishing a control link between at least two of the RAT modules. The control link can stretch between respective inter-module interfaces and may be used for various inter-module signaling purposes. Such inter-module signaling purposes may include the exchange of IRAT handover-related messages via the control link.

The techniques presented herein may be realised in the form of software, in the form of hardware, or using a combined software/hardware approach. A software aspect may provide a computer program product comprising program code portions for performing the steps presented herein when the computer program product is run on one or more processors. The computer program product may be stored on a computer-readable recording medium such as a memory chip, a CD-ROM, a harddisk, to and so on.

BRIEF DESCRIPTION OF THE DRAWINGS

Further aspects and advantages of the techniques presented herein will become apparent from the following description of preferred embodiments and the drawings, wherein:

FIG. 6 shows a table illustrating the connection states of the terminal device embodiment of FIG. 4

DETAILED DESCRIPTION

In the following description of preferred embodiments, for purposes of explanation and not limitation, specific details are set forth (such as particular interfaces, network access technologies and sequences of steps) in order to provide a thorough understanding of the technique presented herein. It will be apparent to one skilled in the art that the technique presented herein may be practiced in other embodiments that depart from these specific details. For example, while the embodiments will primarily be described in context with third and fourth generation mobile communications standards such as the UMTS and Long Term Evolution (LTE) standards, respectively, it will be evident that the technique can also be practiced in combination with a second generation mobile communications technology according to, for example, the Global System for Mobile communications (GSM) standard or in combination with a short-range wireless communication technology such as Bluetooth or any WLAN standard (e.g., from the IEEE 802.11 suite).

Moreover, those skilled in the art will appreciate that the services, functions and steps explained herein may be implemented using software functioning in conjunction with a programmed micro processor, an ASIC, a DSP, an FPGA or a general purpose computer. It will also be appreciated that while the following embodiments will primarily be described in context with methods and devices, the technique presented herein may also be embodied in a computer program product as well as in a system comprising a computer processor and a memory coupled to the processor, wherein the memory is encoded with one or more programs that may perform the services, functions and steps disclosed herein.

Figure 1:
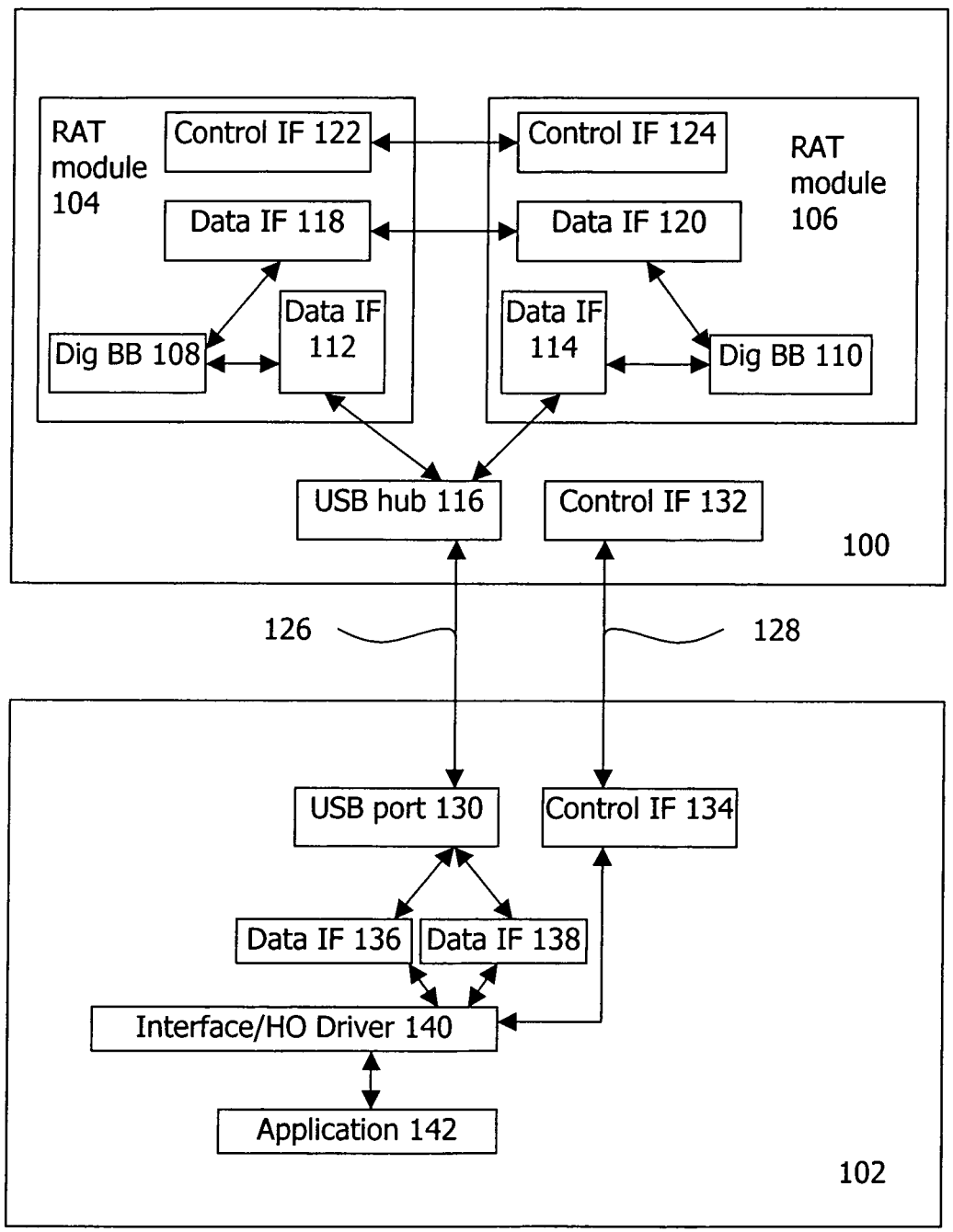
FIG. 1 shows an exemplary communication system with a first modem device embodiment and a first terminal device embodiment.

FIG. 1 shows an exemplary communication system comprising an embodiment of a modem device 100 as well as an embodiment of a terminal device 102. In one example, the modem device 100 is configured as a network card, and the terminal device 102 is configured as a laptop having a standard slot for removably receiving the network card.

The modem device 100 comprises two mobile platform modules 104, 106 ("RAT modules") each supporting one or more RATs and each realized in the form of a separate chip or chip set. In the present embodiment, support for a specific RAT includes the provision of at least one dedicated baseband processor 108, 110 for this RAT on the respective module 104, 106. Although not shown in FIG. 1, each RAT module 104, 106 may further comprise dedicated RF components (such as RF filters and RF amplifiers), or such RF components may be jointly used by the two RAT modules 104, 106.

The RAT module 106 may be provided in the form of a platform main chip supporting one or more existing or legacy RATS such as EDGE, Wideband Code Division Multiple Access (WCDMA), GSM or High Speed Packet Access (HSPA) radio technologies. The other RAT module 104 may be provided in the form of a platform co-chip supporting one or more novel RATs such as LTE or evolved HSPA (eHSPA).

The RAT modules 104, 106 comprise a plurality of interfaces. First of all, each RAT module 104, 106 comprises a data interface 112, 114 towards the terminal device 102. The data interfaces 112, 114 are configured to be used by the terminal device 102 to obtain network access via the one or more RATs supported by each RAT module 104, 106. In one implementation, the data interfaces 112, 114 are realized in accordance with the USB standard. Specifically, the data interfaces 112, 114 may be configured in accordance with a USB device class presenting the RAT modules 104, 106 as Ethernet network cards towards the terminal device 102. Suitable USB device classes providing Ethernet via USB include, for example, USB CDC ECM, USB CDC EEM, USB CDC ENCM, and USB NCM.

In the embodiment shown in FIG. 1, the two data interfaces 112, 114 are connected to an USB hub 116 presenting the two data interfaces 112, 114 in the form of a single physical data port towards the external device 102. Accordingly, while there exist two logical USB Ethernet devices on the two RAT modules 104, 106, only a single physical USB port will be presented towards the external device 102. It should be noted that the data interfaces 112, 114 towards the external device 102 need not necessarily be configured in accordance with the USB standard. Other possible interface standards include the Universal Asynchronous Receiver/Transmitter (UART) standard or any proprietary standard.

As shown in FIG. 1, the RAT modules 104, 106 additionally include optional inter-platform data interfaces 118, 120. These inter-platform data interfaces 118, 120 allow for a user data transfer between the two mobile platform modules 104, 106. Such a user data transfer may, for example, be required if an application (not shown in FIG. 1) residing within or on top of RAT module 106 wishes to obtain network access via the RAT provided by RAT module 104, and vice versa. In a data card configuration without any local application requiring network access, the inter-platform data interfaces 118, 120 may be omitted.

The inter-platform data interfaces 118, 120 may be configured as USB interfaces, and in such a case the interface on one RAT module implements the UBS host role, while the interface on the other RAT module implements the USB device role. Of course, other interface standards including UART and proprietary standards can be used also.

In addition to the data interfaces 112, 114 towards the external device and the inter-platform data interfaces 118, 120, the RAT modules 104, 106 comprise optional inter-platform control interfaces 122, 124. The inter-platform control interfaces 122, 124 will be utilized for the exchange of control signaling between the two RAT modules 104, 106. Such control signaling may include IRAT synchronization signaling, IRAT handover signaling, SIM access signaling from one RAT module to the other RAT module (in such a case only a single one of the two RAT modules 104, 106 needs to provide SIM access functionalities), and system control signaling including RAT module wake-up functionalities. The control interfaces 122, 124 can be configured in accordance with the UART standard, the USB standard, the General Purpose Input/Output (GPIO) standard, any other public interface standard (e.g., SDIO, HIS, UniPro, SPI, etc.) or any proprietary standard. If supporting a high enough data rate, the control interfaces 122, 124 may at the same time be utilized for user data transfer, and in such a case the two inter-platform data interfaces 118, 120 may be omitted.

The modem device 100 communicates with the terminal device 102 via a data connection 126 on the one hand and a control connection 128 on the other. The data connection 126 stretches from the physical port of the USB hub 116 to a physical USB port 130 of the terminal device 102. The control connection 128, on the other hand, stretches between a control interface 132 of the modem device 100 and a corresponding control interface 134 of the terminal device 102. The control interfaces 132, 134 may be configured in accordance with the UART standard or any proprietary standard. Alternatively, the control interfaces 132, 134 could be omitted and control signaling be exchanged via the link between the port provided by the USB hub 116 on the one side and the USB port 130 of the terminal device 102 on the other side.

As shown in FIG. 1, the terminal device 102 comprises a first data interface 136 and a second data interface 138 which are adapted to be coupled to the modem device 100 to obtain network access via the RATs supported by the modem device 100. Specifically, the first data interface 136 is a logical USB interface adapted to be coupled to the corresponding USB interface 112 of the RAT module 104 to obtain network access via the one or more RATs provided by the RAT module 104, and the second data interface 138 is a logical USB interface adapted to be coupled to the corresponding USB interface 114 of the RAT module 106 to obtain network access via the one or more RATs provided by the RAT module 106.

The terminal device 102 further comprises an interface and handover driver 140 adapted, inter alia, to bind the first data interface 136 and the second data interface 138 of the terminal device 102 into one logical network interface. As a consequence, an application 142 of the terminal device 102 requiring network access will not see the two separate data interfaces 112, 114 of the modem device 100, but will only see the single logical network interface provided by the driver 140.

The driver 140 is coupled to the control interface 134 to receive connection information indicative of the availability (i.e., of the connection state) of the RATs supported by the RAT modules 104, 106. The driver 140 may thus selectively switch either to the first data interface 112 or to the second data interface 114 depending on the control information received via the control interface 134.

Figure 2:
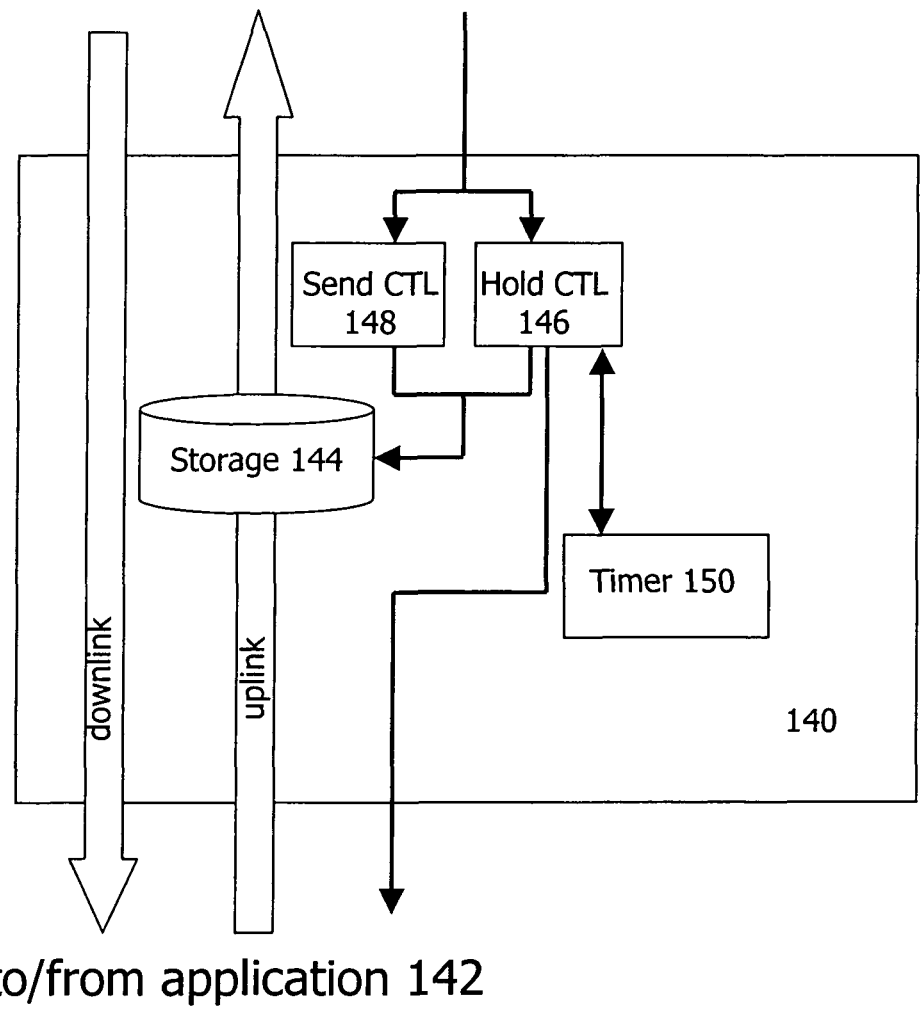
FIG. 2 shows a schematic block diagram of a driver component of the first terminal device embodiment.

FIG. 2 shows some components of the interface and handover driver 140. As illustrated in FIG. 2, both the downlink data path from the RAT modules 104, 106 to the application 140 and the uplink data path in the opposite direction pass through the driver 140. A storage 144 in the form of a buffer for temporarily storing (e.g., queuing) the data transmitted in the uplink data path is included in or at least accessible as an external component by the driver 140. Specifically, the storage 144 permits to hold data from the application 142 that is intended to be transmitted via one or both of the RAT modules 104, 106.

Figure 3:
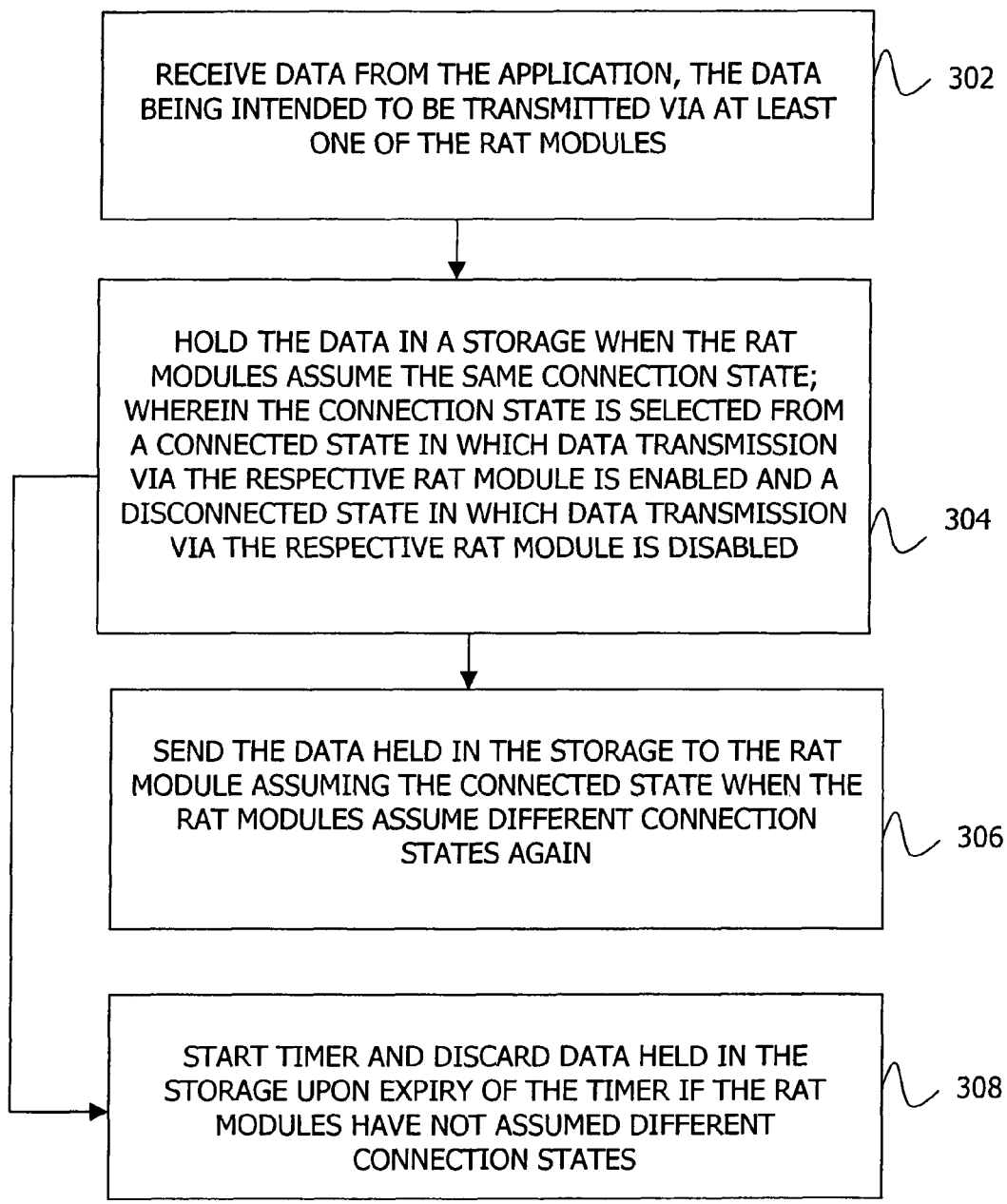
FIG. 3 schematically shows a flow diagram according to a method embodiment.

The driver 140 additionally comprises two control mechanisms 146, 148 and a timer 150. The control mechanisms 146, 148 are coupled to the control interface 134 of the terminal device 102 (see FIG. 1) to receive connection information in relation to the two RAT modules 104, 106. In their combination, the two control mechanisms 146, 148 and the timer 150 control the holding of data in the storage 144 as well as the sending or discarding of data held in the storage 144 as will now be described in more detail with reference to the schematic flow diagram 300 shown in FIG. 3.

In a first step 302, the driver 140 receives data from the application 142 that is intended to be transmitted via at least one of the RAT modules 104, 106. The data may be any application data typically generated by a user application such as a web browser, Voice-over-Internet Protocol (VoIP) application or any other application. In step 302, one of the RAT modules 104 is connected to the respective access network while the other RAT module is disconnected from the respective access network.

In a next step 304 the control mechanism 146 determines from the connection information received from the RAT modules 104, 106 that both RAT modules have assumed the same connection state. This connection state is either a connected state in which data transmission via the respective RAT module 104, 106 is enabled or a disconnected state in which data transmission via the respective RAT module 104, 106 is disabled.

In response to detecting that the RAT modules 104, 106 are currently both in the connected state or both in the disconnected state, the control mechanism 146 initiates holding of the data from the application 142 in the storage 144. The storage 144 thus intercepts the uplink data path for temporarily buffering (e.g., queuing) the uplink data until either a data sending command or a data discarding command is received.

As soon as holding of the data in the storage 144 is initiated by the control mechanism 146, the uplink data path to the RAT modules 104, 106 is blocked so that the RAT modules 104, 106 will no longer be fed by the terminal device 102 with data from the application 142. The downlink data path on the other hand bypasses the storage 144, so that data from any of the RAT modules 104, 106 that is still in the connected state is still fed to the application 142. Such an asymmetric data transmission scenario may, for example, occur during an IRAT handover phase in which both RAT modules 104, 106 are temporarily in the connected state. It will be appreciated that during a disconnecting phase in which one of the two RAT modules 104, 106 remains in the disconnected state while the other RAT module just enters the disconnected state, no data will be transmitted in the downlink data path while the application 142 may still send data on the uplink data path that is then held at least temporarily in the storage 144.

In a third step 306, the second control mechanism 148 initiates sending of the data held in the storage 144. Initiating sending of the data held in the storage 144 by the second control mechanism 148 is dependent on the connection information as received via the control interface 134 (see FIG. 1). As soon as the second control mechanism 148 detects that the RAT modules 104, 106 have assumed different connection states again, the control mechanism 148 initiates sending of the data held in the storage 144 to this RAT module 104, 106 that assumes the connected state. The RAT modules 104, 106 will, for example, assume different connection state after the IRAT handover phase has been completed and the originally connected RAT module assumes the disconnected state again, while the other RAT module has become connected. In another connection scenario in which one of the RAT modules 104, 106 remains disconnected and the other suffers from only a brief connection failure, sending of the data held in the storage 144 is initiated as soon as the other RAT module becomes connected again.

Upon initiating the holding of the data in the storage 144 by the first control mechanism 146 in step 304, the control mechanism 146 also starts a timer 150 as illustrated in step 308. The timer 150 thus runs in parallel to detecting by the second control mechanism 148 when the RAT modules 104, 106 assume different connection states again. The timer 150 is provided to prevent a storage overflow of the storage 144 in case the RAT modules do not assume different connection states again. Specifically, the control mechanism 146 initiates a discarding of the data held in the storage 144 if the RAT modules 104, 106 have not assumed different connection states upon expiry of the timer. At the same time, the control mechanism 146 may notify the application 142 or any other component of the terminal device 102 of this fact as illustrated by the corresponding arrow in FIG. 2.

Figure 4:
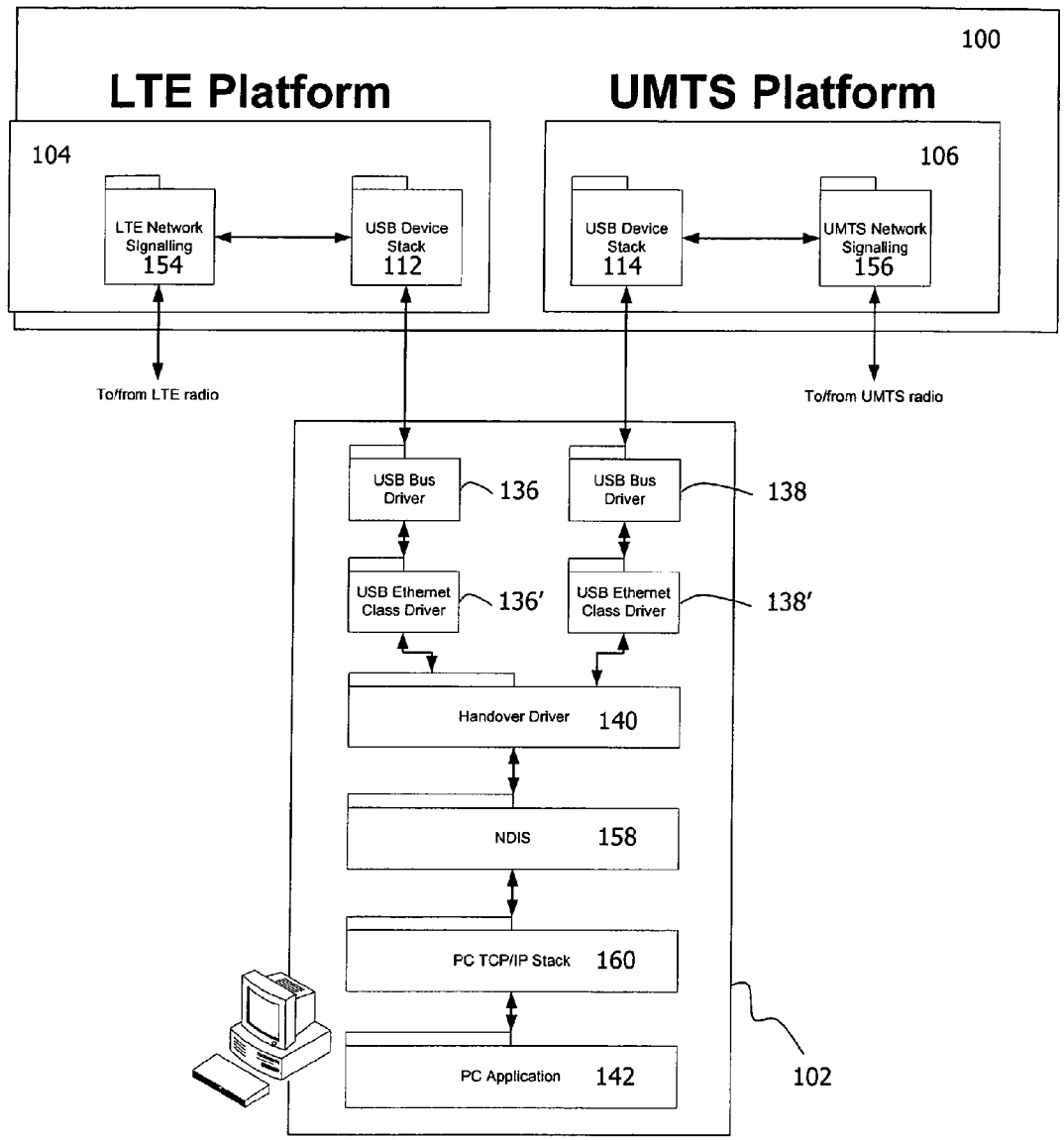
FIG. 4 shows an exemplary communication system with a second modem device embodiment and a second terminal device embodiment.

FIG. 4 shows a more detailed system embodiment that may be derived from the system embodiment discussed above in context with FIGS. 1 and 2. The same reference numerals will thus be used to identify the same or similar components.

In the embodiment shown in FIG. 4, the modem device 100 is again a dual-mode device comprising a first RAT module 104 supporting LTE network access and a second RAT module 106 supporting UMTS network access.

As can be gathered from FIG. 4, each RAT module 104, 106 further comprises a network signaling module 154, 156 that constitutes an interface towards the associated access network. The network signaling modules 154, 156 are in charge of the signaling required to establish and maintain a network connection (e.g., a connection to the Internet or the core network of an operator) via the associated RAT.

Each RAT module 104, 106 may additionally comprise a network address management component (not shown in FIG. 4) in the form of an IP module with IP layer functionalities. The network address management components are configured to communicate with each other via the control interfaces 122, 124 shown in FIG. 1 (omitted in FIG. 4). This inter-platform communication between the two network address management components aims at synchronizing the IP stacks maintained by each network address signaling component. Such a synchronization includes the transfer of an IP address, that has been allocated by the network, between the respective IP stacks. After the IP stack synchronization, the two RAT modules 104, 106 will act towards the outside world (i.e., towards the network and towards the terminal device 102), as if the modem device 100 had only a single IP stack.

Each of the RAT modules 104, 106 provides an external USB device data interface 112, 114, respectively, and presents itself as Ethernet network card towards the terminal device 102. The UMTS platform module 104 is therefore configured to present itself as USB Ethernet Network Access Point (NAP) device to the terminal device 102 giving the USB host network access using UMTS RAT via USB Ethernet. In a similar manner, the LTE platform module 106 is configured to present itself, via the USB device interface 114, as USB Ethernet NAP device to the terminal device 102, thus giving the USB host network access using LTE RAT via USB Ethernet.

On the side of the terminal device 102, in addition to a general USB bus driver 136, 138 (and possible drivers for other USB classes), there exists for each RAT module 104, 106 a PC USB device class driver 136', 138' which provides Ethernet via USB (e.g., according to USB CDC ECN, USB CDC EEN, USB CDC ENCN, or USB NCN). Each USB Ethernet connection to the modem device 100 includes a mechanism (based on NotifyConnect and NotifyDisconnect messages) according to which the USB device stack of the corresponding USB interface 112, 114 indicates to the associated USB Ethernet class driver 136', 138' connection information indicative of whether or not there exists an active network connection.

The interface and handover driver 140 is configured to communicate in accordance with the Network Driver Interfaces Specification (NDIS) towards the operating system of the terminal device 102 and the application 142. To this end, an NDIS module 158 is located between the driver 140 and the IP stack 160. NDIS is an Application Programming Interface (API) for Network Interface Cards (NICs).

As mentioned above, the driver 140 combines the two Ethernet devices represented by the two data interfaces 112, 114 and presents both as a single NIC to the NDIS module 158, IP stack 160 and the application 142. In this regard, the driver 140 may simply indicate whether there is an NIC connected to the network (e.g., the Internet) or not. However, the signaling of the driver 140 towards the application 142 does not distinguish between which of the two USB Ethernet devices is connected. From the connection state of the LTE USB Ethernet device (data interface 112) and the connection state of the UMTS USB Ethernet device (data interface 114), the driver 140 may determine the connection state of the NIC.

Certain communication scenarios may require an IRAT handover during an ongoing data session. Such a handover may occur from the LTE RAT to the UMTS RAT or vice versa depending on considerations such as RAT signal strengths, network access costs, quality-of-service, and the like. In the case of an IRAT handover, the switching from one RAT to the other is in one scenario not done inside the modem device 100, but inside the terminal device 102 by the driver 140 (for example by switching from the USB Ethernet connection provided by the UMTS module 106 to the USB Ethernet connection provided by the LTE module 104 or vice versa). This switching is done such that there will be no service disconnection when changing from one RAT to the other RAT.

Since the switching is controlled by the driver 140, there has to be a mechanism that indicates to the USB host driver 140 which USB Ethernet connection is currently the one with the active RAT. Such a mechanism can optionally be based on the control connection 128 discussed above in context with FIG. 1. The generation of the corresponding switching control command can alternatively be controlled by the modem device 100.

According to a very simple switching strategy, the user data will always be routed to the fastest available USB Ethernet device (which will be presented by the LTE module 104 in the present embodiment and which will only be available if the LTE RAT is active). The decision strategy underlying the generation of the switching control command could also be more advanced. For example, the LTE module 104 may direct the USB host driver 140 via the control connection 128 (see FIG. 1) by notifications from an LTE USB Ethernet notification pipe to prepare and execute a handover between the USB Ethernet devices presented by the data interfaces 112, 114. It is possible that either the LTE module 104 or the UMTS module 106 controls the generation of the switching control command for the driver 140. However, it is also conceivable that the LTE module 104 sends the connection state of the LTE RAT and the UMTS module 106 the connection state of the UMTS RAT via separate notifications to the driver 140 to enable an autonomous decision within the terminal device 102.

An USB host driver (not shown) installed on the terminal device 102 is adapted to bind the two USB Ethernet devices presented by the two data interfaces 112, 114 into one logical network interface with the same IP address. Accordingly, an operating system (with the associated IP stack 160) and the application 142 running on the operating system only see a single network device instead of two dedicated RAT modules 104, 106. As already mentioned above in context with FIG. 1, the two logical USB Ethernet devices presented by the two data interfaces 112, 114 can optionally be merged by a USB hub 116 so that only a single physical USB port or interface is presented towards the terminal device 102.

As has been explained above, the USB Ethernet connections between the RAT modules 104, 106 on the one side and the terminal device 102 on the other side comprises a mechanism to indicate whether there is an active network connection or not. This mechanism is based on the transmission of NotifyConnect and NotifyDisconnect messages from the RAT modules 104, 106 to the terminal device 102. In one implementation, the RAT modules 104, 106 are configured such that the establishment of a network connection (network attach) or the loss of a network connection (network detach or network disconnect) function as trigger for sending the NotifyConnect and NotifyDisconnect messages to the terminal device 102.

Specifically, the LTE module 104 is configured to send such messages to the terminal device 102 in the case of the following events:
  connect to LTE network: NotifyConnect message
  disconnect from LTE network: NotifyDisconnect message
  reception of handover complete message from UMTS module 106 for handover from LTE to UMTS: NotifyDisconnect message
  reception of handover command to handover from UMTS to LTE (this message may be received via the UMTS network): NotifyConnect message.

The UMTS module 106 is configured to send NotifyConnect and NotifyDisconnect messages to the terminal 102 in the case of the following events:
  connect to UMTS network: NotifyConnect message
  disconnect from UMTS network: NotifyDisconnect message
  reception of handover complete message from LTE module 104 for handover from UMTS to LTE: NotifyDisconnect message
  reception of handover command to handover from LTE to UMTS (this message may be received via the LTE network): NotifyConnect message In the above example, network attach and network detach processes have been used as trigger for sending NotifyConnect and NotifyDisconnect messages from the modem device 100 to the terminal device 102. As an alternative connection state indication and alternative trigger for sending these messages, the establishment of the first packet domain connection and the release of the last packet domain connection by the RAT modules 104, 106 may be used as will now be explained.

The LTE module 104 may thus send a NotifyConnect message to the terminal device 102 upon establishment of the first packet domain connection to the LTE network for the USB Ethernet link as well as upon reception of a handover command to handover from UMTS to LTE (this command is received via the UMTS network). On the other hand, the LTE platform will sent a NotifyDisconnect message upon release of the last packet domain connection to the LTE network for the USB Ethernet link (i.e., afterwards, there will be no more packet domain connection to the LTE network for the USB Ethernet link) as well as upon reception of a handover complete message from the UMTS module 106 for handover from LTE to UMTS.

In a similar manner, the UMTS module 106 will send a NotifyConnect message upon establishment of the first packet domain connection to the UMTS network for the USB Ethernet link as well as upon reception of a handover command to handover from LTE to UMTS (this command will be received via the LTE network). A NotifyDisconnect message will be sent from the UMTS module 106 to the terminal device 102 upon release of the last packet domain connection to the LTE network for the USB Ethernet link (i.e., afterwards, there will be no more packet domain connection to the LTE network for the USB Ethernet links) or upon reception of a handover complete message from the LTE module 104 for a handover from UMTS to LTE.

Out of the connection status of the LTE USB Ethernet interface 112 (LTE module 104) and the connection status of the UMTS USB Ethernet interface 114 (UMTS module 106), the driver 140 determines the connection status of the NIC (i.e., of the modem device 100). The various connection scenarios are illustrated in the exemplary state diagram 500 of FIG. 5. It should be noted that for an USB connection, OUT denotes the direction from the USB host (terminal device 102) to the USB device (modem device 100), while IN denotes the inverse direction.

The state diagram 500 illustrates four possible connection states 502, 504, 506, 508 and the associated operational modes of the driver 140. A first connection state 502 indicates that neither an LTE connection nor an UMTS connection is available. Connection state 504 indicates the availability of an LTE connection only, and connection state 506 indicates the availability of an UMTS connection only. The availability of both connections (typically during an IRAT handover phase) is represented by connection state 508.

Figure 5:
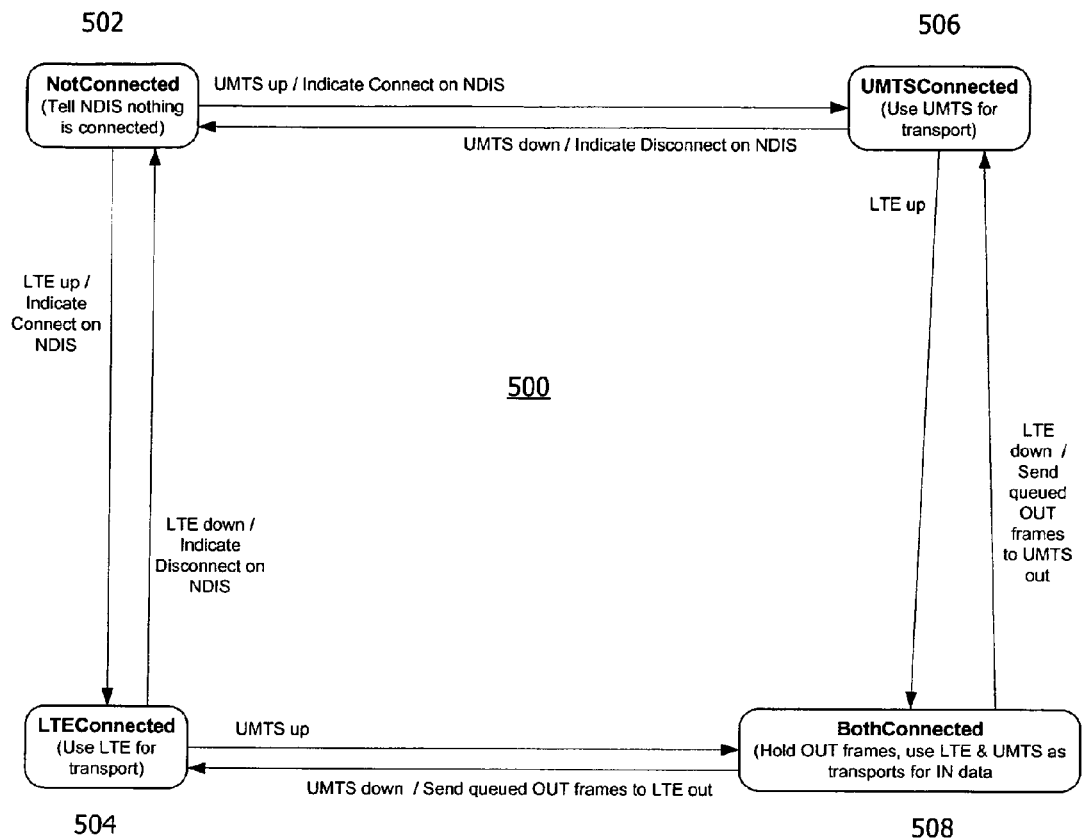
FIG. 5 shows a first state diagram illustrating an operation of the terminal device embodiment of FIG. 4.

In FIG. 5, "LTE/UMTS up" denotes the reception of a NotifyConnect message from the LTE/UMTS module 104, 106 (with the prerequisite that the LTE/UMTS USB device including the USB Ethernet class is enumerated). On the other hand, "LTE/UMTS down" denotes the reception of a NotifyDisconnect message from the LTE/UMTS module 104, 106 or a deregistration of the USB Ethernet device by the LTE/UMTS module 104, 106.

The state diagram of FIG. 5 is to a large extent self-explanatory, and for this reason only the crucial connection state 508 in which both the LTE module 104 and the UMTS module 106 are connected to the access network will be described in more detail. Connection state 508 corresponds to an exemplary IRAT handover phase in which in addition to an existing UMTS connection an LTE connection becomes available. In this exemplary IRAT handover scenario the connection state 508 ("Both Connected") is thus reached from the connection state 506 ("UMTS Connected").

As soon as the control mechanism 146 illustrated in FIG. 2 detects that both the LTE module 104 and the UMTS module 106 have a network connection (i.e., assume the same connection state), it initiates holding of the application data on the uplink data path in the storage 144, so that no further uplink data is sent to the LTE and UMTS modules 104, 106. On the downlink data path, on the other hand, one or even both of the LTE and UMTS modules can be used for transferring data from the network side to the application 142. In other words, the downlink data are directly forwarded to the application 142, while the uplink data from the application 142 are queued in the storage 144.

When the IRAT handover phase has successfully been concluded and the UMTS connection goes down, the connection state 504 ("LTE Connected") as illustrated in the state diagram 500 of FIG. 5 is assumed. The control mechanism 148 of FIG. 2 detects the loss of the UMTS connection and in response to this detection initiates the sending of the application data queued in the storage 144 to the single RAT module still active, namely the LTE module 104. During the sending of the data held in the storage 144 to the LTE module 104, the further data received from the application 142 may also be buffered in the storage 144 until the storage 144 is empty (assuming a higher data rate from the storage 144 to the LTE module 104 than from the application 142 to the storage 144). Alternatively, data may be transmitted to the LTE module 104 in parallel from the storage 144 and from the application 142.

While FIG. 5 has been explained for the exemplary case of an IRAT handover from UMTS to LTE, it will be appreciated that a similar procedure as discussed above will be performed in the case of an IRAT handover from LTE to UMTS. Accordingly, a discussion of the handover to UMTS is omitted here.

FIG. 6 shows a table 600 illustrating the various possible connection states of the LTE module 104 and the UMTS module 106 as well as the corresponding enablement of the LTE and UMTS uplink and downlink data paths. In FIG. 6, the attribute "YES" indicates that data transmission towards the network is enabled. The attribute "NO" indicates that data transmission towards the network is disabled because the corresponding RAT module 104, 106 is disconnected, or because the data received from the application 142 is buffered in the storage 144. The exemplary IRAT handover from UMTS to LTE discussed above in context with FIG. 5 starts with the connection scenario indicated in the third line of table 600, proceeds to the connection scenario in the fourth line of FIG. 6, and ends with the connection scenario in the second line of FIG. 6.

In the following, two alternative state diagrams and the associated operation of the driver 140 illustrated in FIG. 2 will be discussed with reference to FIGS. 7 and 8.

Figure 7:
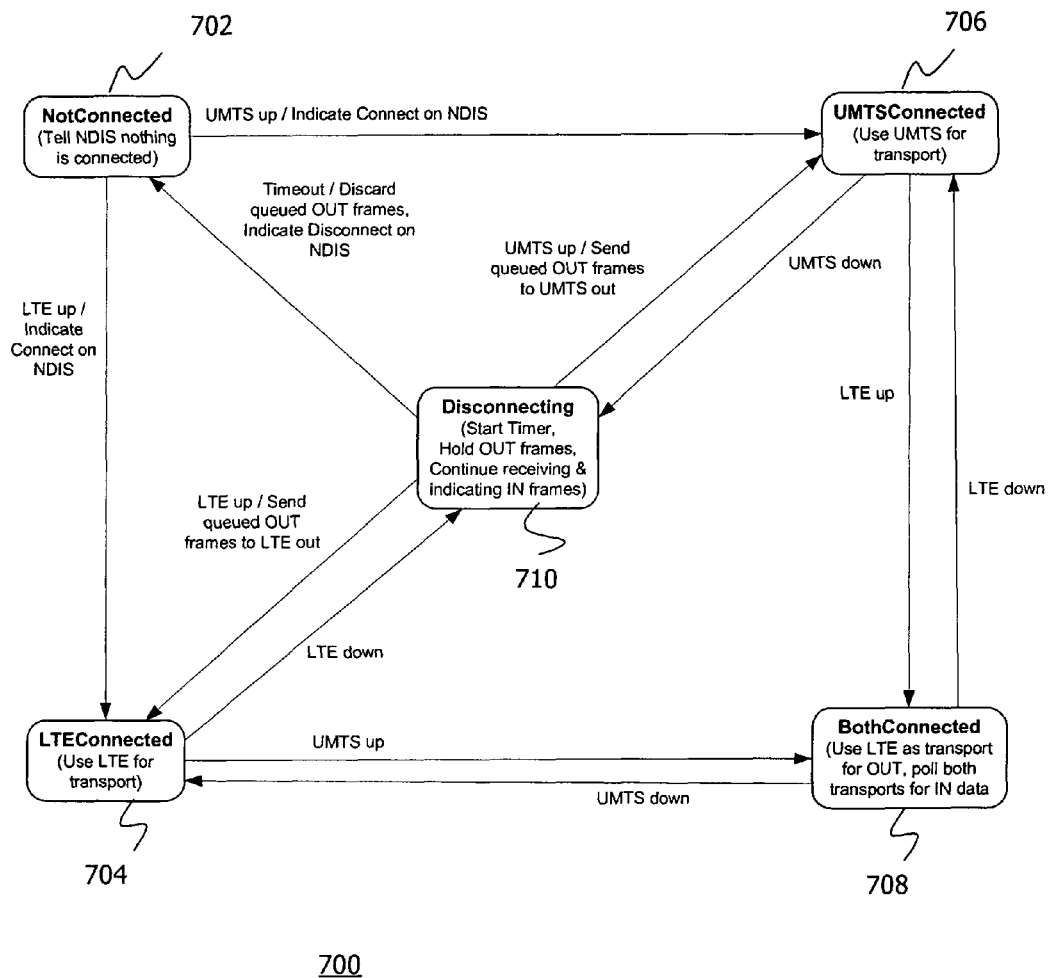
FIG. 7 shows a second state diagram illustrating an operation of the terminal device embodiment of FIG. 4.

Starting with the state diagram 700 of FIG. 7, connection states 702, 704 and 706 essentially correspond to connection states 502, 504 and 506 as discussed above and will thus not be described in more detail. Connection state 708 corresponds to connection state 508 ("Both Connected"), but has been modified such that the LTE connection is always used for data transfer towards the access network in case both RAT modules 104, 106 are connected. In the opposite direction from the network to the application 142, both RAT modules 104, 106 are used for data transfer. It should be noted that connection state 708 may require an inter-module data transfer in certain handover scenarios.

As becomes apparent from FIG. 7, there is no direct transition from any connected state 704, 706, 708 to the connection state 702 representative of a lacking connection. Rather, a disconnecting state 710 (and an associated timing procedure) always intercepts a transition from any of the connection states 704, 706, 708 to the disconnected state 702. If both the LTE RAT and the UMTS RAT go down (i.e., become disconnected), this will again be detected by the control mechanism 146 of FIG. 2, and the disconnecting state 710 will be temporarily assumed. At the same time, the control mechanism 146 initiates holding of the application data in the storage 144 and starts the timer 150.

Only if neither one of the two RATs has gone up again before expiry of the timer 150, the disconnected state 702 will be assumed. At the same time, the data held in the storage 144 will be discarded in response to the time out. If, on the other hand, one of the two RATs goes up again, this will be detected by the control mechanism 148, so that the data held in the storage 144 can be sent out to the corresponding RAT module 104, 106 that has become connected. This corresponds to a transition from the disconnecting state 710 to one of the connected states 704, 706 and 708.

The provision of the disconnected state 710 provides the advantage of a more stable system operation in case of only brief network access failures without any loss of application data.

Figure 8:
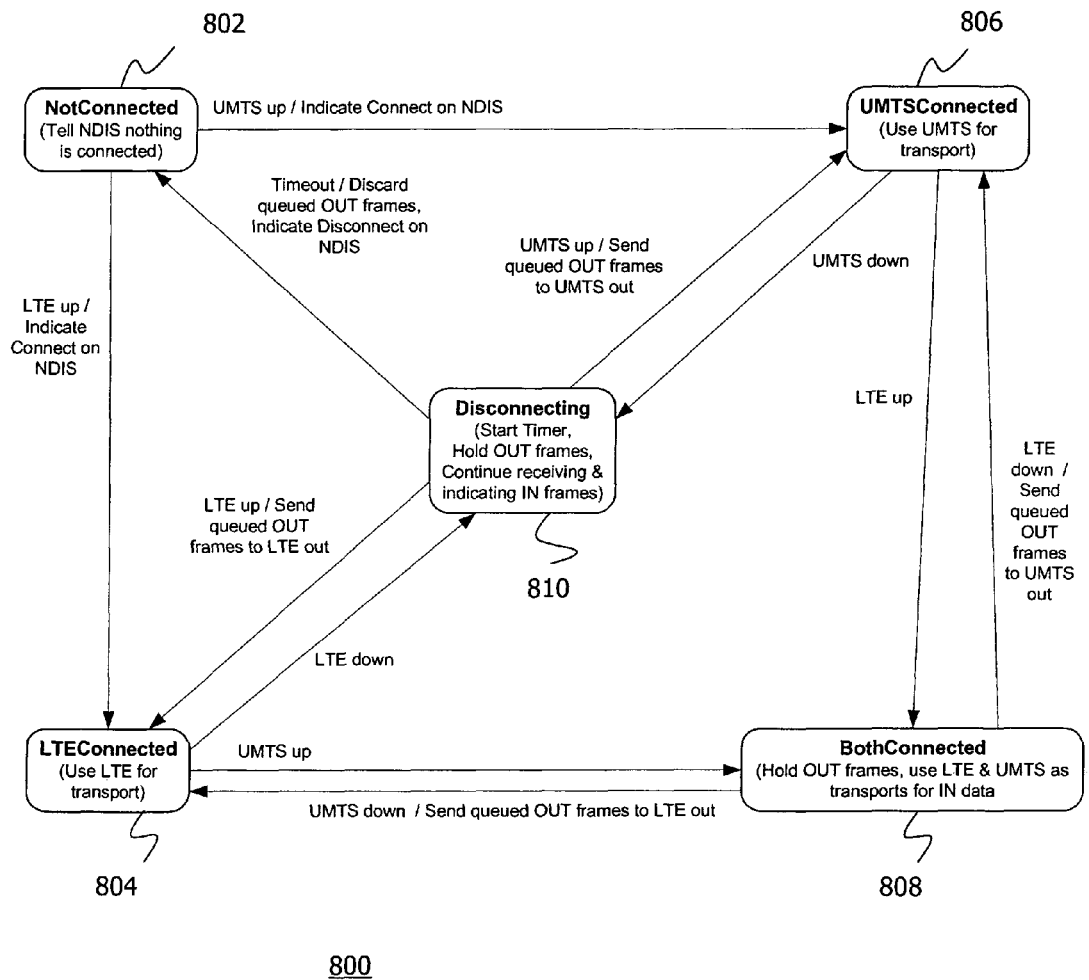
FIG. 8 shows a third state diagram illustrating an operation of the terminal device embodiment of FIG. 4.

FIG. 8 shows an alternative mode of operation of the driver 140 illustrated in FIG. 2. Specifically, the state diagram 800 of FIG. 8 corresponds to a combination of the operational mode illustrated in FIG. 5 and the operational mode illustrated in FIG. 7. Connection states 802, 804 and 806 correspond to connection states 502, 504, 506 as well as 702, 704, 706, respectively. Connection state 808 corresponds to connection state 508, and connection state 810 corresponds to connection state 710. In combination with the explanations given above, it will be apparent that the operational mode illustrated in FIG. 8 provides a buffering of application data on the uplink data path during both a disconnecting phase and an IRAT handover phase.

It should be noted that the storage concept described above is not limited to the system configuration of FIGS. 1 and 4 in which two external RAT modules 104, 106 are connected to the terminal device 102 via two logical interfaces. For this reason, three exemplary alternative system configurations will now be described with reference to FIGS. 9 to 11. While the following embodiments will be described with reference to LTE, UMTS and WLAN, it will be apparent that other RATs may, of course, also be used.

Figure 9:
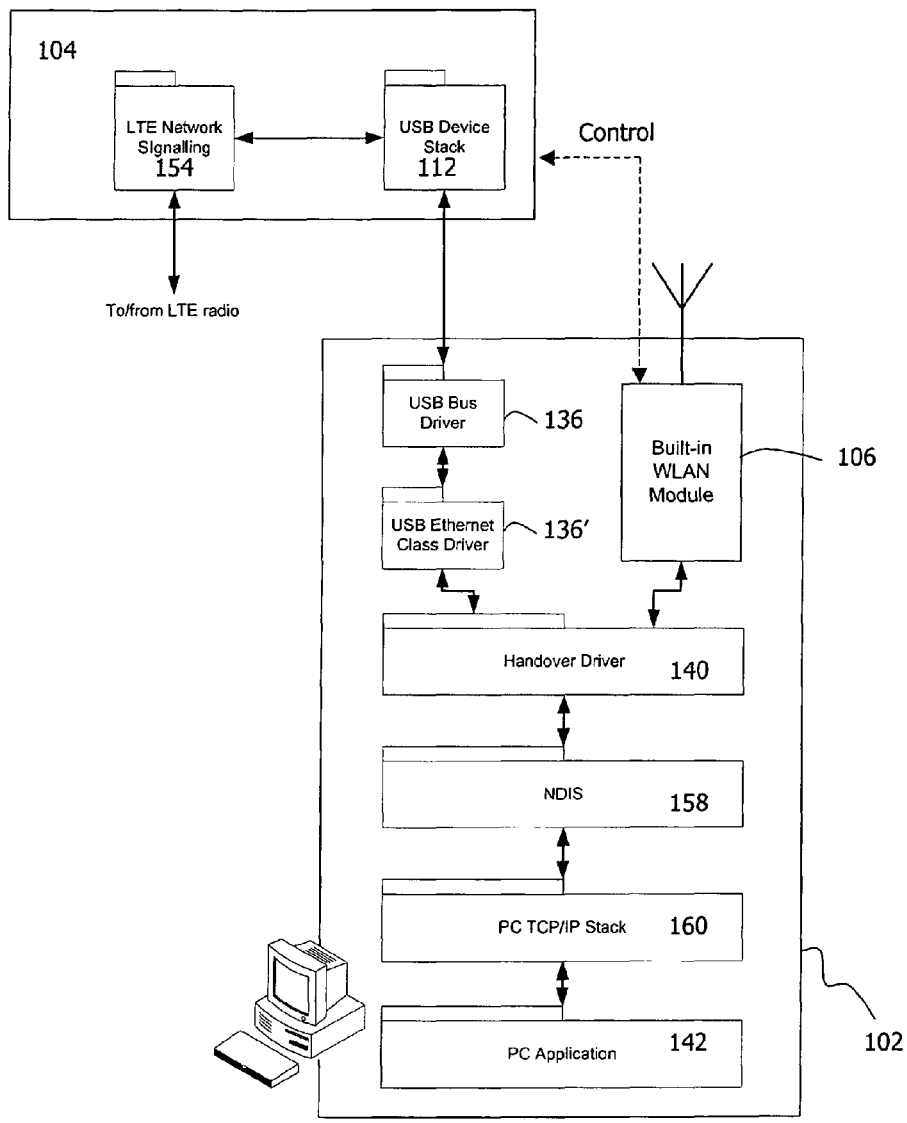
FIG. 9 shows an exemplary communication system with a third modem device embodiment and a third terminal device embodiment.

Turning first to the alternative system configuration of FIG. 9, a terminal device 102 with a built-in wireless module 106 and with an external interface to an LTE module 104 is shown. Components identical or similar to components of the previous embodiments will again be denoted by the same reference numerals, and only the configurational differences will be discussed in more detail.

In the scenario of FIG. 9, both the LTE module 104 (which may, for example, be part of a modem device such as a network card or mobile telephone) and the built-in WLAN module 106 present themselves as Ethernet network cards towards the driver 140 and NDIS module 158. While the LTE module 104 is physically connected to the terminal device 102 via an external USB connection, the built-in WLAN module 106 is integrated on a motherboard (not shown) of the terminal device 102. The physical connection between the WLAN module 106 and the motherboard may be based on Peripheral Component Interconnect Express (PCI Express) standard.

Again, each connection between the RAT modules 104, 106 and the driver 140 includes a mechanism that allows the RAT module 104, 106 to indicate whether there is an active network connection or not. A separate control link between the LTE module 104 and the WLAN module 106 is used to exchange control messages such as handover-related control messages.

The scheme for the connection and disconnection notifications sent by the LTE module 104 and the WLAN module 106 to the driver 140 could be as follows. The LTE module may be configured to send a NotifyConnect message to the terminal device 102 upon establishment of the first packet domain connection to the LTE network for the USB Ethernet link as well as upon receipt of a handover command to perform a handover from WLAN to LTE (this command may be received via the WLAN network). A NotifyDisconnect message is sent by the LTE module 104 upon release of the last packet domain connection to the LTE network for the USB Ethernet link (i.e., afterwards, there will be no more packet domain connection to the LTE network for the USB Ethernet link) and upon receipt of a handover complete message from the WLAN module 106 for handover from LTE to WLAN.

The WLAN module 106, on the other hand, shall send connection information (such as NotifyConnect and NotifyDisconnect messages, which are seen here from a functional point of view while the real implementation and thus the naming could be different) in the case of the following events. Specifically, a connect message may be sent upon establishment of the first packet domain connection via WLAN to the network (e.g., the Internet) and upon reception of a handover command to handover from LTE to WLAN (this command is received via the LTE network). On the other hand, a disconnect message may be sent from the WLAN module 106 upon release of the last packet domain connection via WLAN to the network (i.e., afterwards, there will be no more packet domain connection via WLAN to the network) and upon receipt of a handover complete message from the LTE module 104 for handover from WLAN to LTE.

Figure 10:
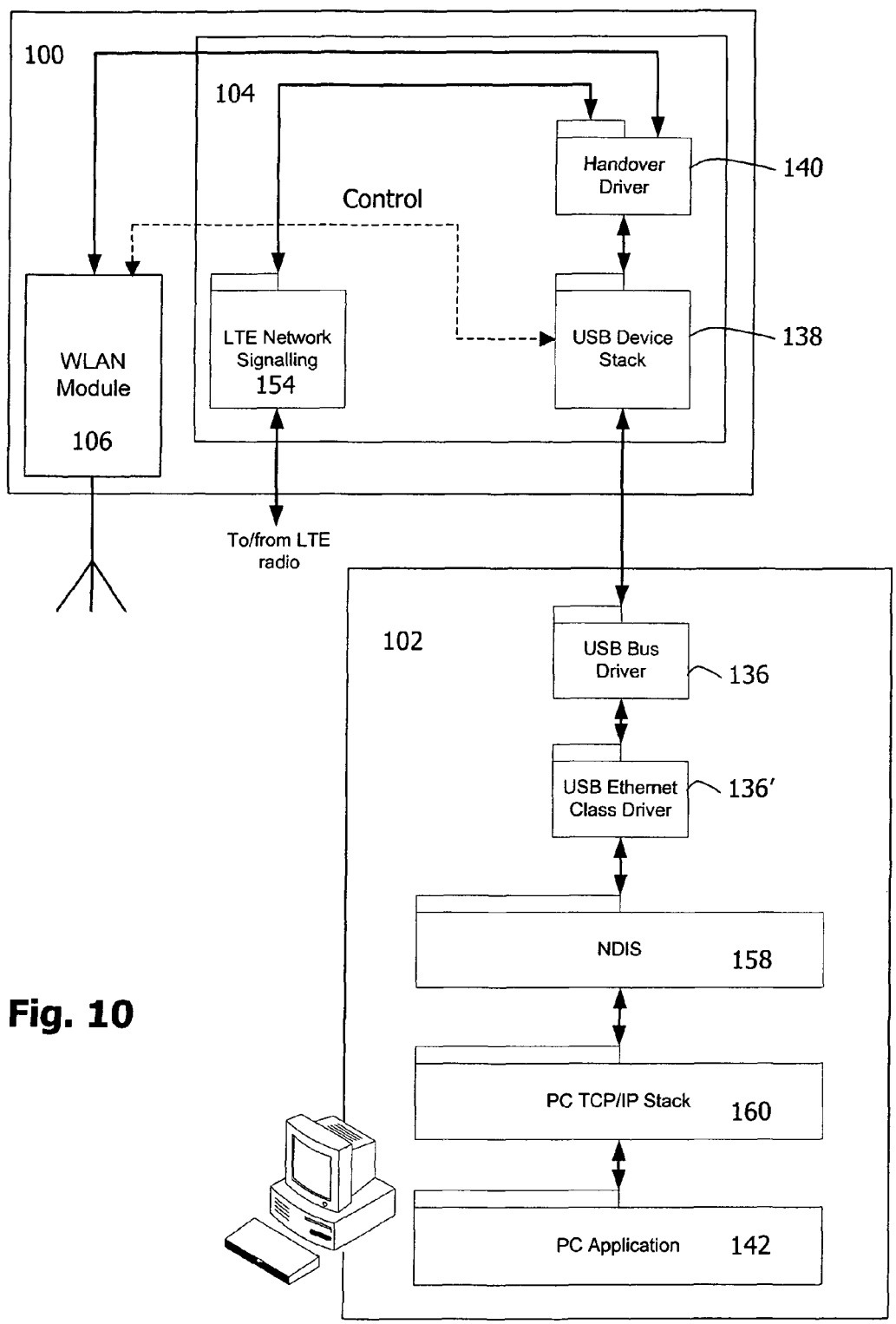
FIG. 10 shows an exemplary communication system with a fourth modem device embodiment and a fourth terminal device embodiment.

FIG. 10 illustrates a further system configuration in which a terminal device 102 is connected to an external modem device 100 via a single logical interface. Again, the same reference numerals will be used to designate the same or similar components as in the previous embodiments.

The modem device 100 with its LTE module 104 and WLAN module 106 is connected via a single physical interface (such as an USB Ethernet interface) to the terminal device 102. In this case, the IRAT handover of the user data path is handled on the side of the modem device 100 and not on the side of the terminal device 102. Accordingly, the handover driver 140 is located on the modem device 100 (i.e., on the multi-RAT platform) instead of on the terminal device 102. The driver 140 may again be configured as shown in FIG. 2.

The LTE stack and the WLAN stack (the latter being part of the WLAN module 106) of the modem device 100 are internally connected to the driver 140, and each interface between the driver 140 and the modules 104, 106 includes a mechanism that allows the wireless stacks to indicate to the driver 140 whether there is an active network connection or not. It should be noted that the WLAN stack could alternatively also be located on the LTE module 104. A separate control link between the LTE stack and the WLAN stack is provided to exchange control messages (such as handover-related messages).

The scheme for the connection and disconnection notifications sent by the LTE stack and the WLAN stack to the driver 140 could be as follows. The LTE stack may be configured to send a connect/disconnect notification (e.g., a NotifyConnect/NotifyDisconnect message) to the driver 140 for the following events. A NotifyConnect message is sent upon establishment of the first packet domain connection to the LTE network as well as upon receipt of a handover command to handover from WLAN to LTE (this message will be received via the WLAN network). On the other hand, a NotifyDisconnect message will be sent upon release of the last packet domain connection to the LTE network (i.e., afterwards, there will be no more packet domain connection to the LTE network) as well as upon receipt of a handover complete message from the WLAN module 106 for handover from LTE to WLAN.

The WLAN module 106 is configured to send a connect/disconnect notification to the driver 140 in the case of the following events. Upon establishment of the first packet domain connection via WLAN to the network as well as upon receipt of a handover command to handover from LTE to WLAN (via the LTE network), the LTE module sends a NotifyConnect message. On the other hand, a NotifyDisconnect message is sent upon release of the last packet domain connection via WLAN to the network (i.e., the Internet) and upon receipt of a handover complete message from the LTE module 104 for handover from WLAN to LTE.

Figure 11:
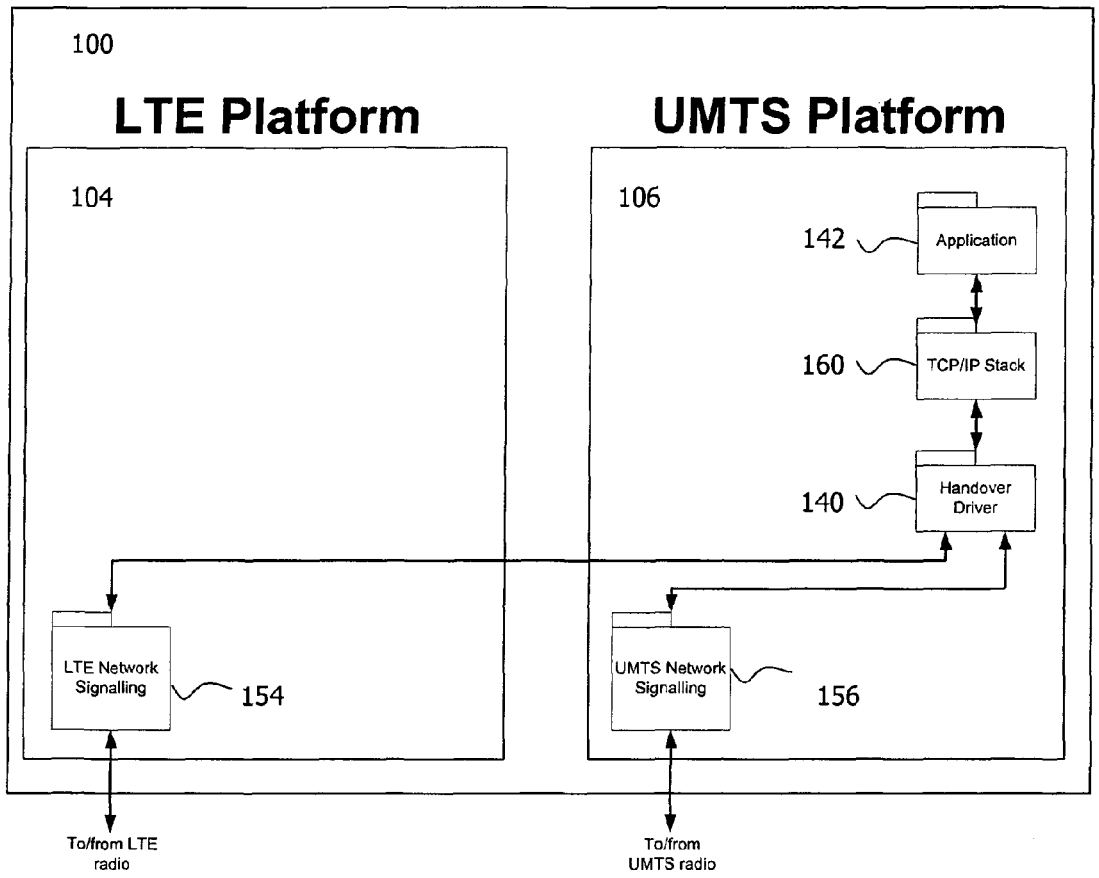
FIG. 11 shows a further exemplary device embodiment.

Turning now to the system configuration of FIG. 11, a multi-RAT mobile device 100 (such as a mobile telephone) using the driver mechanism discussed in combination with the previous embodiments will be described. Again, the same reference numerals will be used to designate the same or similar components.

The multi-RAT device 100 comprises an LTE module 104 as well as an UMTS module 106. In such a device configuration, the concept described in the previous embodiments for the terminal device 102 can be used to perform the IRAT handover within the device 100 using the data holding approach discussed above in context with FIG. 2. Accordingly, the handover driver 140 is added to the device 100 for coordinating the IRAT handover between UMTS and LTE.

The LTE stack and the UMTS stack are internally connected to the driver 140. Moreover, a mechanism is provided that allows each wireless stack to indicate to the driver 140 whether there is an active network connection or not. It should be noted that the LTE and UMTS functionalities could physically be integrated in one single chip or chip set. In such a case the LTE module 104 and the UMTS module 106 would constitute separate logical entities. Although not shown in FIG. 11, there may exist a separate control link between the LTE stack and the UMTS stack to exchange control messages (such as handover-related control message).

The scheme for signaling connection and disconnection notifications from the LTE stack and the UMTS stack to the driver 140 could be as follows. The LTE stack may send a NotifyConnect (or similar) message to the driver 140 upon establishment of the first packet domain connection to the LTE network and upon receipt of a handover command to handover from UMTS to LTE (as received via the UMTS network). A NotifyDisconnect message could be sent by the LTE stack upon release of the last packet domain connection to the LTE network (i.e., afterwards, there will be no more packet domain connections with the LTE network) and upon receipt of a handover complete message from the UMTS module 106 for handover from LTE to UMTS.

The UMTS stack, on the other hand, shall sent a NotifyConnect (or similar) message upon establishment of the first packet domain connection via UMTS to the network (e.g., to the Internet) as well as upon receipt of a handover command to handover from LTE to UMTS (this message may again be received via the LTE network). The UMTS stack sends a NotifyDisconnect (or similar) message upon release of the last packet domain connection via UMTS to the network (i.e., afterwards, there will be no more packet domain connection via UMTS to the network) and upon receipt of a handover complete message from the LTE module 104 for handover from UMTS to LTE.

As has become apparent from the above, the buffering technique suggested herein provides a plurality of advantages. Such advantages include the fact that in certain situations inter-module data interfaces can be avoided or at least relieved from data transfer. Additionally, inter-module data transfer control mechanisms can be avoided or at least configured less complex. These advantages are mainly the result of the fact that in certain connection scenarios uplink data are buffered instead of being transferred to the RAT modules.

Since data or logical interfaces and data transfer mechanisms between different modules can be avoided, it is easier to realize a multi-RAT solution with RAT modules from different manufacturers. In other words, in many cases no knowledge of proprietory interface and control specifications is required.

Additionally, external interfaces between modem and user devices can be based on common interface standards such as the USB Ethernet interface mechanism. USB Ethernet class drivers are not affected by the implementation of the handover logic in the terminal device, as the handover logic may completely be encapsulated in a driver component. As a further result, the handover can be fully controlled by the terminal device if required. An additional advantage is the fact that the handover driver suggested herein allows an IRAT handover between built-in RAT modules and externally connected RAT modules.

In the following, various embodiments will be discussed for coordinating the connection signaling between the RAT modules 104, 106 and the handover driver 140. These embodiments may, in principle, be practiced independently from the holding and buffering concept discussed in connection with the above embodiments.

It has been recognized that the connection signaling mechanisms may be incompatible with the above suggestions in case the RAT modules are provided from different manufacturers. In particular, a third party RAT module may signal connection information that is not compatible with the control strategies described above. For example, the third-party RAT module may send a NotifyConnect message to the terminal device 102 already when the start-up sequence is completed, even though no network connection has yet been established. In case the other RAT module is already connected, the terminal device 102 would thus see a handover in progress all the time.

One solution to this problem is, of course, to adapt the third-party RAT module to behave as expected concerning the transmission of NotifyConnect and NotifyDisconnect messages. Nonetheless, a solution which is more independent from the behaviour of the connection signaling of the third-party RAT platform would be preferable and is described hereinafter.

It has been found that a graceful handover which is independent from the implementation details the NotifyConnect/NotifyDisconnect mechanism in the third-party RAT platform requires an additional protocol for controlling the driver 140 from one single RAT module (the "controlling RAT module"). In order to support an additional protocol for controlling the driver 140 with minimum impact on the software of the terminal device 102 and without adding additional proprietory control messages for the USB Ethernet class, a mechanism is proposed which is based on the idea of encoding control commands in connection information. Specifically, a sequence of NotifyConnect and NotifyDisconnect messages, which are issued by the controlling RAT module and which are part of the standard USB Ethernet protocol, is used to encode different handover requests.

According to the encoding approach proposed herein, a NotifyConnect (or similar) message is interpreted as a logical "1", and a NotifyDisconnect (or similar) message is interpreted as a logical "0". One control command from the controlling RAT module consists of a stream of NotifyConnect and NotifyDisconnect messages, which is interpreted by the driver 140 as a logical sequence of bits.

Figures 12, 13:
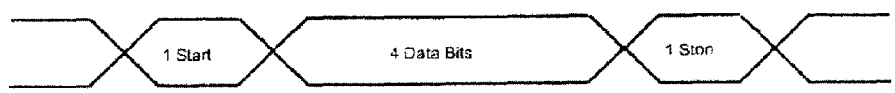
FIG. 12 schematically shows the signal structure of a control command.
FIG. 13 shows a table illustrating the encoding of control commands using two-state or binary connection information.

FIG. 12 exemplarily shows the signaling of a control command using a sequence of NotifyConnect and NotifyDisconnect messages. The control command comprises a start bit, a stop bit and four data bits for encoding the command. The start bit is identical to the pending (current) connection state as previously signalled by the controlling RAT module. In other words, the repeated signaling of the present connection state is interpreted by the driver 140 as a start bit announcing a control message. Depending on the current connection state, the start bit is thus signaled either by a NotifyConnect or a NotifyDisconnect message. Similar to the start bit, also the stop bit is a repeated indication of the present connection state (i.e., the connection state of the LTE platform before issuing the sequence of NotifyConnect and NotifyDisconnect messages).

The data bits are used to encode the control commands from the controlling RAT module to the driver 140. When exemplarily using 4 data bits and implementing a coding scheme without adding redundancy, this means that 16 different control commands (e.g., handover-related control commands) can be signalled as exemplarily shown in the table 1300 of FIG. 13.

The processing of NotifyConnect and NotifyDisconnect messages is controlled via a timer (which may be provided in addition to the timer 150 shown in FIG. 2) of the driver 140. If timeout occurs during reception of a control command (i.e., of a sequence of NotifyConnect and NotifyDisconnect messages), the sequence is invalidated and the driver 140 returns to its previous state.

The driver 140 may comprise registry settings for "command mode enabled/disabled" and for a timeout value for the command sequence. If the command mode is disabled, the NotifyConnect and NotifyDisconnect messages are interpreted in accordance with their original meaning. It should be noted that the USB stack of the non-controlling RAT module may be used without any modifications during the handover scenario.

In the following, one specific command scenario will be described with reference to the table 1300 of FIG. 13. It is assumed that a third-party RAT module with its USB stack connects to the terminal device 102 of FIG. 4 during normal start up. In such a case, the controlling RAT module could send a command sequence instructing the driver 140 to ignore this connect request from the non-controlling RAT module because it is not part of a handover scenario at this time (bit sequence 1010). If a handover has to be executed, the controlling RAT module could send a command (not shown in table 13) to the driver 140 to take care of connect and disconnect requests from the non-controlling RAT module.

It should be noted that the signaling context described above is not limited to the handover case. It can also be used for other remote control mechanisms between an USB Ethernet device and an external USB host. Moreover, it should be noted that the connection state of a RAT module is still indicated by a single NotifyConnect or NotifyDisconnect message.

As has become apparent from the above description of FIGS. 12 and 13, the concept of a controlling RAT module and at least one non-controlling RAT module allows to implement a handover solution which is independent of the NotifyConnect and NotifyDisconnect signaling behaviour of a third-party RAT module. In other words, the third-party RAT module need not be adapted regarding the NotifyConnect and NotifyDisconnect signaling to support a graceful handover as described herein. Also, the solution has minimum impact on the USB host side to support graceful handover as already existing USB mechanisms may be used to add an additional protocol for controlling the driver 140 by an RAT module. In particular, the USB bus and class drivers on the USB host side are not affected and the interface towards the terminal device 102 can be based on the standard USB Ethernet interface mechanisms.

It is believed that many advantages of the technique presented herein will be fully understood from the forgoing description, and it will be apparent that various changes may be made in the form, construction and arrangement of the exemplary aspects thereof without departing from the scope of the invention or without sacrificing all of its advantages. Because the invention can be varied in many ways, it will be recognized that the technique presented herein should be limited only by the scope of the following claims.

The invention claimed is:

1. A device for transferring data between an application and Radio Access Technology (RAT) modules selectively connectable to a network, the device comprising:
    a storage adapted to hold data from the application, the data being intended to be transmitted via at least one of the RAT modules;
    a first control mechanism adapted to initiate holding of the data in the storage when the RAT modules assume a connected state in which data transmission via a respective RAT module is enabled and when the RAT modules assume a disconnected state in which data transmission via the respective RAT module is disabled; and
    a second control mechanism adapted to initiate sending of the data held in the storage to at least one of the RAT modules when the RAT modules assume different connection states.

2. The device of claim 1, further comprising a timer configured to be started upon initiating the holding of the data in the storage, wherein the data in the storage is discarded if the RAT modules have not assumed different connection states upon expiry of the timer.

3. The device of claim 2, wherein the timer is configured to be started when the RAT modules all assume the disconnected state.

4. The device of claim 1, further comprising a data route bypassing the storage, the data route being adapted to forward data coming from at least one of the RAT modules directly to the application.

5. The device of claim 1, wherein the device comprises at least one of the RAT modules.

6. The device of claim 1, wherein the device comprises an external interface for coupling to at least one of the RAT modules installed on an external apparatus.

7. The device of claim 6, wherein the device is coupled via the external interface to the at least one of the RAT modules installed on the external apparatus, and the device further comprises:
    a logical interface for each of the at least one of the RAT modules installed on the external apparatus; and
    an interface driver for presenting the respective logical interface as a single network interface to the application.

8. The device of claim 1, wherein the device is at least one of a mobile or stationary terminal, a personal computer, a laptop, a mobile telephone, a network card, and an integrated circuit chip or chip set.

9. A method of transferring data between an application and Radio Access Technology (RAT) modules selectively connectable to a network, the method comprising:
    receiving data from the application, the data being intended to be transmitted via at least one of the RAT modules;
    initiating holding the data in a storage when the RAT modules assume a connected state in which data transmission via a respective RAT module is enabled and when the RAT modules assume a disconnected state in which data transmission via the respective RAT module is disabled; and
    sending the data held in the storage to at least one of the RAT modules when the RAT modules assume different connection states.

10. The method of claim 9, further comprising:
    starting a timer upon initiating the holding of the data in the storage; and
    discarding the data in the storage if the RAT modules have not assumed different connection states upon expiry of the timer.

11. The method of claim 9, wherein holding of the data in the storage is initiated during a disconnecting phase in which at least one connected first RAT module enters the disconnected state and at least one disconnected second RAT module remains in the disconnected state.

12. The method of claim 9, wherein holding of the data in the storage is initiated during an internal RAT (IRAT) handover phase in which at least one disconnected first RAT module enters the connected state and at least one connected second RAT module remains in the connected state.

13. The method of claim 9, further comprising forwarding data, coming from at least one of the RAT modules, directly to the application, wherein the forwarding of the data to the application is performed concurrently with holding the data coming from the application in the storage.

14. The method of claim 9, wherein holding of the data in the storage is initiated during an IRAT handover phase in which the RAT modules are in the connected state.

15. The method of claim 9, further comprising receiving connection information from at least one of the RAT modules.

16. The method of claim 15, further comprising controlling at least one of the holding of the data in the storage and the sending of the data held in the storage based on the connection information.

17. The method of claim 15, wherein the connection information received from one of the RAT modules indicates the connected state if the respective RAT module gets connected to an access network or establishes a first packed domain connection to the access network, and indicates the disconnected state if the respective RAT module gets disconnected from an access network or upon release of the last packed domain connection to the access network.

18. The method of claim 15, wherein the connection information received from one of the RAT modules indicates the connected state if the respective RAT module receives a handover command to take over, and indicates the disconnected state if the respective RAT module receives a handover complete message regarding take over by another one of RAT modules.

19. The method of claim 9, further comprising receiving one or more control commands, wherein the control commands are directed to at least one of an IRAT handover control, a validity of the control commands received from at least one of the RAT modules, a connection control towards the application, and a connection control towards at least one of the RAT modules.

20. The method of claim 19, wherein the control commands are received from at least one of the RAT modules.

21. The method of claim 19, wherein the control commands are encoded in connection information.

22. The method of claim 9, further comprising:
 establishing a control link between the RAT modules; and
 exchanging IRAT handover-related messages via the control link.

* * * * *